(12) United States Patent
Winkler et al.

(10) Patent No.: US 6,510,693 B2
(45) Date of Patent: Jan. 28, 2003

(54) METHOD AND DEVICE FOR PRODUCING HOT WORKING GASES

(75) Inventors: Dieter Winkler, Lauchringen (DE); Timothy Albert Griffin, Ennetbaden (CH); Ulf Linder, Leicester (GB)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 09/975,307

(22) Filed: Oct. 12, 2001

(65) Prior Publication Data

US 2002/0124558 A1 Sep. 12, 2002

Related U.S. Application Data

(60) Provisional application No. 60/239,887, filed on Oct. 13, 2000.

(30) Foreign Application Priority Data

Mar. 21, 2001 (CH) .............................................. 0514/01

(51) Int. Cl.⁷ ............................................... F01K 25/06
(52) U.S. Cl. ...................... 60/649; 60/39.02; 60/39.182
(58) Field of Search ...................... 60/649, 651, 39.02, 60/39.181, 39.182

(56) References Cited

U.S. PATENT DOCUMENTS

| | | | |
|---|---|---|---|
| 4,341,069 A | * 7/1982 | Bell et al. .................... 518/703 |
| 4,434,613 A | * 3/1984 | Stahl ........................ 60/39.182 |
| 5,753,007 A | 5/1998 | Russek et al. |
| 5,976,223 A | 11/1999 | Prasad et al. |
| 6,298,084 B1 | * 10/2001 | Vinggaard et al. .......... 375/224 |
| 6,298,664 B1 | * 10/2001 | .ANG.sen et al. ............. 60/649 |

FOREIGN PATENT DOCUMENTS

| | | |
|---|---|---|
| DE | 197 55 116 C1 | 3/1999 |
| EP | 0 882 486 A1 | 12/1998 |
| WO | 98/55208 A1 | 7/1997 |
| WO | 98/55394 A1 | 7/1997 |

* cited by examiner

*Primary Examiner*—Hoang Nguyen
(74) *Attorney, Agent, or Firm*—Burns, Doane, Swecker & Mathis, L.L.P.

(57) ABSTRACT

The invention relates to a method for producing hot working gases for a gas turbine system. In a burner, combustion that generates hot combustion waste gas takes place. A portion of the combustion waste gas branches off and feeds into an oxygen separation device. A heat exchanger produces a heated oxygen-containing gas from oxygen-containing gas. The heated oxygen-containing gas feeds to the oxygen separation device. The oxygen separation device includes an oxygen separation means that removes oxygen from the heated oxygen-containing gas and feeds it to the branched-off waste gas. Oxygen-reduced hot gas then leaves the oxygen separation device. Oxygen-enriched branched-off waste gas as well as fuel feed to the burner and form a combustion mixture that burns in the burner while forming the hot combustion waste gases. In order to improve the efficiency of the device, the oxygen-enriched branched-off waste gas heats the oxygen-containing gas.

12 Claims, 2 Drawing Sheets

METHOD AND DEVICE FOR PRODUCING HOT WORKING GASES

This application claims the benefit of provisional application No. 60/239,887, filed Oct. 13, 2000.

FIELD OF THE INVENTION

The invention relates to a method and a device for producing hot working gases, in particular for a gas turbine system, with the characteristics of the preamble of claim 1 or, respectively, claim 4.

BACKGROUND OF THE INVENTION

EP 0 882 486 A1 discloses a method and a device of the above-mentioned type. The known device has a burner that is supplied on an inlet side with fuel and oxygen-containing gas. In the burner, a combustion mixture of the oxygen-containing gas and the fuel is burned, whereby hot combustion waste gas is formed. A waste gas line, through which the hot combustion gas exits the burner and can be used at least in part as hot working gas in a following process, is connected to an outlet side of the burner. The known device also has an oxygen separation device that is supplied at a first inlet with combustion waste gas that is branched off from the waste gas line. At a second inlet, this oxygen separation device is supplied with heated, oxygen-containing gas. The oxygen separation device is provided with oxygen separation means that transport oxygen from the heated, oxygen-containing gas to the branched-off combustion waste gas. Oxygen-enriched combustion waste gas that is used as the oxygen-containing gas for supplying the inlet side of the burner then exits at a first outlet of the oxygen separation device. At a second outlet of the oxygen separation device, hot gas with reduced oxygen content and which can be used in a subsequent process as a hot working gas exits. In the known device, the hot gas with reduced oxygen content is used to heat the oxygen-containing gas fed to the oxygen separation device in a heat exchanger.

In principle, it is also possible, however, to use the hot working gases produced in this way, for example, in a gas turbine system for generating electric energy. By using such a device or such a method, it is possible to significantly reduce the noxious emissions during energy generation, especially $CO_2$ emissions, created during the combustion of fossil fuels.

The core idea of this method and these devices is that pure oxygen is used as an oxidant for the combustion, since this significantly simplifies the waste gas after treatment. The reason for this is that a combustion process with molecular oxygen results in a waste gas that essentially consists only of $CO_2$ and $H_2O$. Since oxygen, which is produced in refrigerated plants, is very expensive, new technologies have been developed for producing oxygen. In this context, oxygen separation devices that are provided with a membrane that conducts oxygen ions and electrons, so-called MCM membranes (mixed conducting membranes play an important role. Such an MCM membrane is provided with a retention side, on which the oxygen-containing gas is located, and a pass-through side, on which the gas to be enriched is located. The MCM membrane transports oxygen ions from the retention side to the pass-through side and causes an electron transport from the pass-through side to the retention side. This causes oxygen to be removed from the gas on the retention side and to be fed to the gas on the pass-through side. In order to increase the efficiency of such an MCM membrane, it is advantageous to set a relatively high flow speed on the pass-through side in order to keep the oxygen concentration on the pass-through side as low as possible. It is advantageous for a long useful life of the MCM membrane to perform the following process steps independently from each other in separate units: heating of the oxygen-containing gas, transport of the oxygen from the oxygen-containing gas to the branched-off combustion waste gas, and combustion of the oxygen-enriched combustion waste gas with fuel. The functional separation of these procedures makes it possible to optimize the individual process steps separately, whereby, in particular, the useful life of the MCM membrane can be increased. In other known devices, described below, the previously mentioned processes are able to take place more or less simultaneously in a so-called membrane reactor that essentially corresponds to an oxygen separation device with MCM membrane, but is operated at substantially higher temperatures.

U.S. Pat. No. 5,976,223 discloses a device for producing carbon dioxide and oxygen that works with two oxygen separation devices that each are equipped with an MCM membrane. The first oxygen separation device, which fictions as a membrane reactor, is supplied with oxygen-containing gas that has been compressed and heated on the retention side. On the retention side, a gaseous fuel is supplied that reacts with the supplied oxygen and forms water and carbon dioxide. The oxygen-containing gas with reduced oxygen content is heated by the exothermic reaction that takes place during this process. The oxygen-containing gas heated in this manner is then fed to the second oxygen separation device on its retention side. The desired oxygen then accumulates on the pass-through side of this second oxygen separation device.

WO 98/55394 describes a method in which an oxygen separation device working with an MCM membrane is used as a membrane reactor for producing hot combustion waste gases for a gas turbine system. Ambient air is hereby compressed, heated, and fed to the retention side of the membrane reactor. A mixture of recycled waste gas and fuel is fed to the pass-through side. In the membrane reactor, oxygen is then deleted from the supplied air and is fed into the mixture. The fuel then reacts on the pass-through side with the oxygen on the membrane surface that is coated with an oxidation catalyst. The hot waste gases formed in this manner are then fed into a turbine.

WO 98/55208 discloses another method for producing hot combustion waste gases for operating a turbine, in which compressed fresh air is heated in a first burner and is fed to the retention side of an oxygen separation device working with an MCM membrane. Recycled waste gas is fed together with fuel into a second burner that may be constructed as a catalyzer. The combustion waste gases produced there are then fed to the pass-through side of the oxygen separation device, where they are enriched with oxygen. The oxygen-enriched waste gases are then fed to a third burner and burned there with fuel in order to produce hot combustion waste gases that drive a turbine.

SUMMARY OF THE INVENTION

The invention at hand relates to the objective of disclosing an embodiment for a method and a device of the initially mentioned type with improved efficiency.

In accordance with one embodiment of the present invention, the invention uses the general idea of using the oxygen-enriched, hot combustion waste gases after their exit from the oxygen separation device in order to heat the oxygen-containing gases before these are fed to the oxygen separation device. This measure makes it possible to significantly increase the inlet temperature of the oxygen-containing gases without having to introduce energy from the outside to the system. At the same time, the mass flow for the cooled, oxygen-enriched combustion waste gas can be increased. It is also possible to use standard, mechanically operating compressors or pumps for driving the oxygen-enriched combustion waste gases fed to the burner. By using the energy that is present in any case for heating the oxygen-containing gas, the efficiency of the process can be increased yet further.

In another embodiment of the present invention, the invention uses a heat exchanger, through which oxygen-containing gas to be heated and an oxygen-enriched combustion waste gas exiting from the oxygen separation device are flowing in order to heat the oxygen-containing gases. The desired temperature increase of the oxygen-containing gas is then associated with a useful temperature drop of the oxygen-enriched combustion waste gas. As explained above, this makes it possible to improve the efficiency in producing hot working gases.

In an especially advantageous further development, the oxygen separation device may be provided with a first chamber and a second chamber, whereby the oxygen separation means have a membrane that divides the two chambers from each other and transports oxygen from one chamber into the other chamber, whereby the flow in both chambers has the same direction and flows parallel to the membrane. Correspondingly, the branched-off combustion waste gas and the heated, oxygen-containing gas flow through the oxygen separation device according to the co-current principle. With this construction and this type of operation, a flat temperature profile results in the membrane, both in the flow direction and transversely to it. These characteristics reduce the resulting thermal loads in the membrane, increasing its useful life span.

Other important characteristics and advantages of the invention are found in the secondary claims, drawings, and related descriptions of the drawings.

BRIEF DESCRIPTION OF THE DRAWINGS

Preferred embodiments of the invention are disclosed in the following description and illustrated in the accompanying drawings, in which.

DETAILED DESCRIPTION OF THE INVENTION

Figure 1:
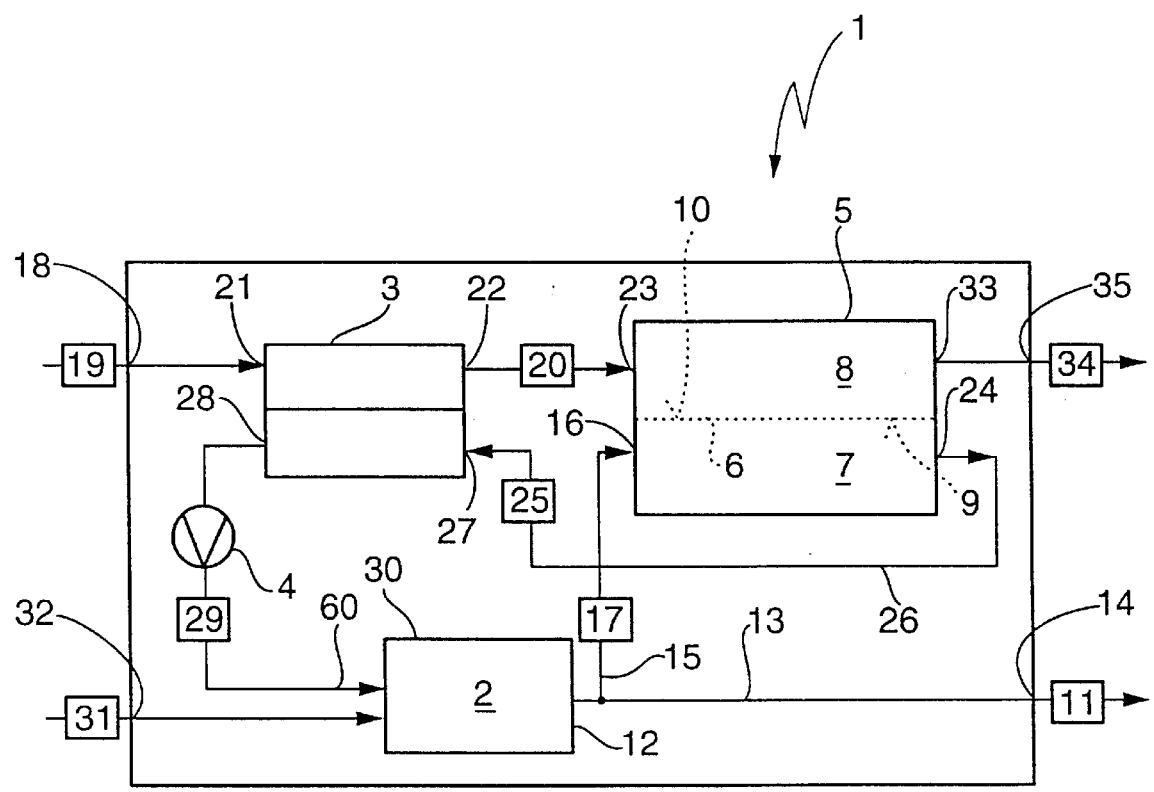
FIG. 1 is a schematic view of a device according to the invention.

According to FIG. 1, a device 1, here symbolized by a box, is provided with a burner 2, a heat exchanger 3, a compressor 4, and an oxygen separation device 5. This oxygen separation device 5 has as an oxygen separation mean an MCM membrane 6 that is symbolized here by a dotted line. This MCM membrane 6 divides a first chamber 7 from a second chamber 8 in the oxygen separation device 5, whereby a pass-through side 9 is associated with the first chamber 7, and a retention side 10 of the membrane 6 is associated with the second chamber 8.

In the burner 2 combustion takes place that produces the hot combustion waste gases 11 that, at an outlet side 12 of the burner 2, enter a waste gas line 13 connected to it. At 14 the desired hot combustion waste gases 11 are discharged from the device 1. These hot combustion waste gases 11 can be used as hot working gases in a subsequent process.

A return line 15 connected to a first inlet 16 of the oxygen separation device 5 branches off from the waste gas line 13. Through this first inlet 16, branched-off waste gas 17 is able to reach the first chamber 7, i.e. the pass-through side 9 of the membrane 6.

At 18, oxygen-containing gas 19, for example air, enters the device 1 and is fed there to a first inlet 21 of the heat exchangers 3. In the heat exchanger 3, the oxygen-containing gas 19 is heated, so that heated, oxygen-containing gas 20 exits from a first outlet 22 of the heat exchanger 3. The first outlet 22 of the heat exchanger 3 is connected to a second inlet 23 of the oxygen separation device 5, so that the heated, oxygen-containing gas 20 enters the second chamber 8, i.e. on the retention side 10 of the membrane 6. The MCM membrane 6 now brings about a transport of oxygen from the retention side 10 to the pass-through side 9. In the process, oxygen is removed from the supplied oxygen-containing gas 20 so that its oxygen content is reduced. At the same time, oxygen is fed into the branched-off waste gas 17, thus enriching it with oxygen. At a first outlet 24 of the oxygen separation device 5, waste gas 25 enriched accordingly with oxygen exits from the first chamber 7 and is fed via a line 26 to a second inlet 27 of the heat exchanger 3. The oxygen-enriched, recycled waste gas 25 is cooled in the heat exchanger 3. Waste gas 29 cooled and oxygen-enriched in this way exits from a second outlet 28 of the heat exchanger 3. The compressor 4 drives the flow of the branched-off waste gas 17, 25, 29. Since the gas fed into the compressor 4 has a relatively low temperature of, for example, less than 800° C., the compressor 4 can be constructed as a mechanical compressor or a compressor or pump or fan.

The cooled, enriched waste gas 29 is fed via a supply line 60, in which the compressor 4 is located, to an inlet side 30 of the burner 2. In addition, fuel or a fuel/steam mixture 31 that enters the device 1 at 32 is fed to the inlet side 30 of the burner 2. A combustion mixture of the oxygen-enriched recycled waste gases 29 and the supplied fuel 31 then forms in the burner 2. This combustion mixture burns in the burner 2, producing the desired hot combustion waste gases 11.

Oxygen-containing gas 34 that now has a reduced oxygen content exits from a second outlet 33 of the oxygen separation device 5.

The temperature of the heated, oxygen-containing gases 20 is not sufficient to ensure a proper oxygen transport through the membrane 6. A suitable heating of the membrane 6 is achieved in that the recycled or branched-off waste gases 17 are again fed to the oxygen separation device 5 relatively uncooled. When flowing through chambers 7 and 8, the membrane 6 also functions as a heat transfer means that causes a cooling of the gases in the first chamber 7 and a heating of the gases in the second chamber 8. Accordingly, the oxygen-containing gas 34 exiting from the device 1 at 35 is relatively hot. This hot, oxygen-containing gas 34 therefore also can be used as a working gas.

It is hereby of special significance that the flow through the two chambers 7 and 8 flows in the same direction, so that temperature loads in the membrane 6 are as low as possible. At the inlet side of the oxygen separation device 5, the temperature of the membrane 6 lies between the higher temperature of the recycled waste gases 17 and the lower temperature of the heated, oxygen-containing gases 20. The temperatures of membrane 6, waste gas 17, and gas 20 adapt to each other until the exit from the oxygen separation device 5.

In the device 1 according to the invention, it is especially important that the oxygen-containing gas 19 is heated with the help of the recycled or branched-off waste gases 25, since this makes it possible to advantageously use the heat energy inherent in the process. The device 1 hereby forms a unit, symbolized by the frame, into which oxygen-containing air 19 or fuel 31 enters at the inlet points 18 and 32, and from which hot working gases, i.e. hot combustion waste gases 11 and hot, oxygen-containing gases 34, exit at outlet points 14 and 35. The individual functions within this device 1, such as, for example, the heating of the oxygen-containing gas 19 in the heat exchanger 3, the transport of the oxygen in the oxygen separation device 5, as well as the combustion of the combustion mixture in the burner 2, hereby can be optimized independently from each other in order to increase the overall efficiency of the device 1. With the exception at the inlet points 18 and 32 and at the outlet points 14 and 35, the device 1 in no way interacts with any preceding or following processes. Accordingly, the optimization of the processes taking place in the device 1 can be performed independently from the preceding or following processes, thereby greatly simplifying the optimization of the device 1.

Figure 2:
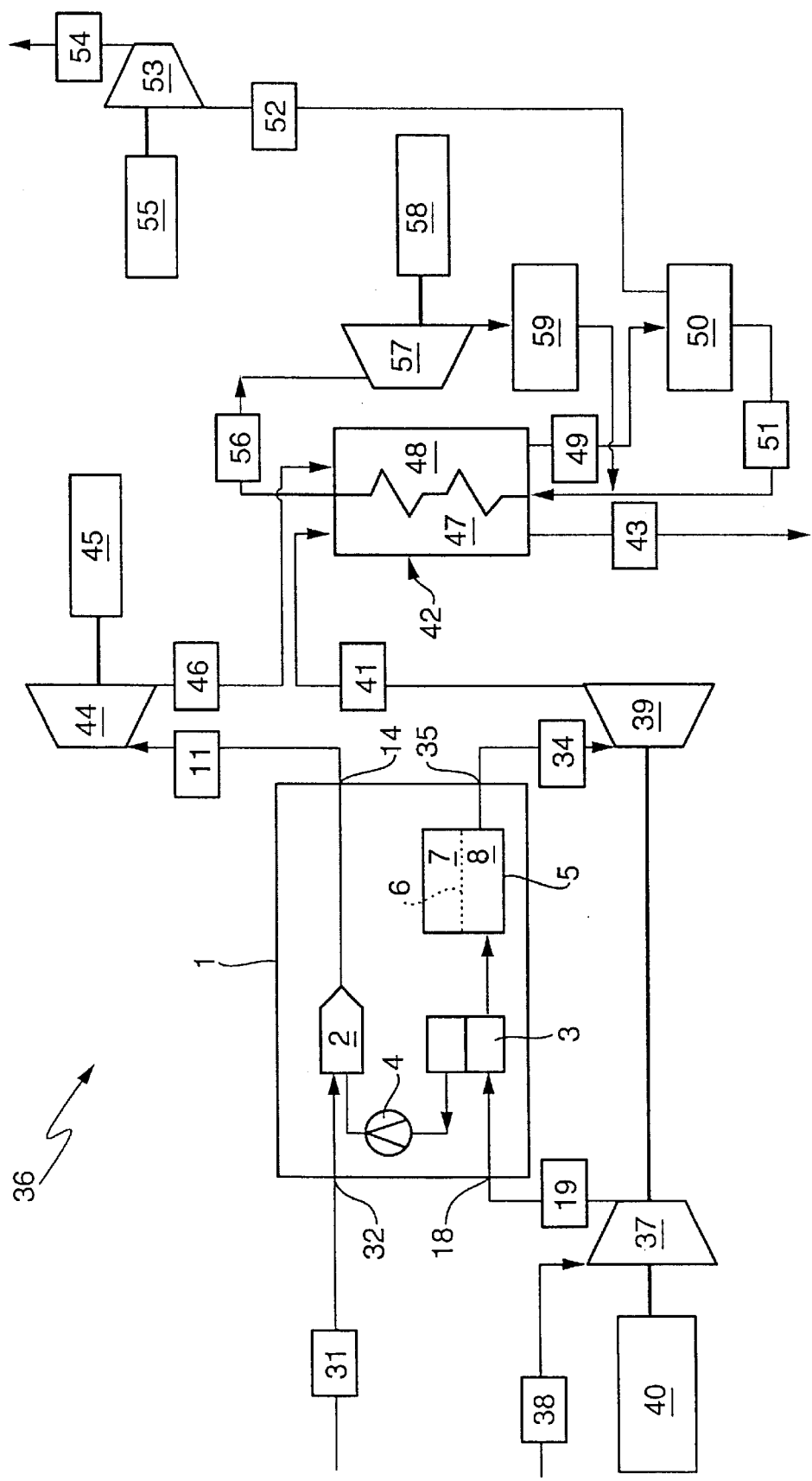
FIG. 2 is a schematic view of a gas turbine system according to the invention.

As shown with reference to FIG. 2, the device 1 according to the invention can be integrated in a gas turbine 36 that is used to generate electricity. FIG. 2 shows how the inlet points 18 and 32 as well as the outlet points 14 and 35 quasi form interfaces integrating the device 1 into the gas turbine system 36.

A compressor 37 compresses ambient air 38, whereby the latter is simultaneously heated. The compressed and heated ambient air forms the oxygen-containing gas 19 that is fed at 18 to the device 1. In the device 1, the oxygen content of the supplied air 19 is reduced, which, in the case of air, also corresponds to an increase in its nitrogen content. The heated, oxygen-poor air 34 exits the device 1 at 35 and is fed to a turbine 39 that is connected to the compressor 37 and a generator 40 for generating electricity. The gas 34 fed to the turbine 39 is expanded in the turbine 39 and forms an expanded flow 41 whose heat is at least partially recovered in a steam generator 42. Then, cooled, oxygen-poor gas 43 that then can be treated further exits from the steam generator 42.

Fuel or fuel/steam mixture 31 is added to the device 1 at 32, whereby this fuel 31 burns inside the device 1—as described above—together with the oxygen of the oxygen-containing gas 19. The resulting combustion essentially produces only $CO_2$ and $H_2O$ and forms the desired hot combustion waste gases 11 that exit the device 1 at 14. The hot combustion waste gases 11 are expanded in a turbine 44 that drives another generator 45 for electricity generation. In the process, expanded combustion waste gases 46 that are also fed to the steam generator 42 form. The steam generator 42 hereby comprises separate chambers 47 and 48 for the expanded, oxygen-poor gases 41 and for the expanded combustion waste gases 46. Then cooled combustion waste gas 49 exits the steam generator 42 and can be fed to a cooler 50 in which the water steam is condensed. The resulting water 51 is again fed to the steam generator 42. The remaining $CO_2$ 52 leaves the cooler 50 and can be compressed and, as the case may be, liquefied, in a compressor 53. The compressed and/or $CO_2$ 54 then can be processed further. The compressor 53 is, for example, driven by a motor 55. A coupling with the turbine 44 is also conceivable.

The steam 56 generated by the steam generator 42 can be expanded in a turbine 57 that drives another generator 58 for electricity generation. The expanded steam then can be condensed in a condenser 59; the resulting water then can be fed into the steam generator 42. It would also be possible to use the steam 56 as process steam for other purposes; for example, the steam 56 can be mixed with the fuel 31 to form a fuel/steam mixture.

In the gas turbine system 36 shown in FIG. 2, energy therefore can be generated by burning fossil fuels without emitting noxious substances, such as $CO_2$, CO, NOx into the atmosphere. This is made possible by the device 1 that provides hot working gases 11 and 34 that either do not contain any noxious substances or have a composition that enables an especially easy removal of noxious substances.

What is claimed is:

1. Method for producing hot working gases for a gas turbine system, the method comprising:

producing a hot combustion gas through combustion in a burner, where the hot combustion gas may be used as a hot working gas;

branching off a portion of a combustion waste gas;

feeding the portion of the combustion waste gas into an oxygen separation device;

heating oxygen-containing gas, thereby forming heated oxygen-containing gas;

feeding the heated oxygen-containing gas to the oxygen separating device, wherein the oxygen separating device includes an oxygen separation means configured to remove oxygen from the heated oxygen-containing gas such that hot gas with reduced oxygen content exits the oxygen separation device;

feeding the oxygen removed from the heated oxygen-containing gas to branched off waste gas formed during the branching off operation to form oxygen-enriched branched off waste gas, wherein the oxygen separation means is configured to feed the oxygen to the waste gas;

forming a combustion mixture by feeding the oxygen-enriched branched off waste gas and a fuel or fuel/steam mixture to the burner where the combustion mixture burns in the burner to form the hot combustion waste gas which exits the burner; and using the hot combustion waste gas as a hot working gas wherein the oxygen-enriched branched off waste gas heats the oxygen-containing gas before the oxygen-containing gas is fed to the burner.

2. Method as claimed in claim 1, the method further comprising:

providing a heat exchanger, the heat exchanger being configured for heat transfer from the oxygen-enriched branched off waste gas to the oxygen-containing gas, where both the oxygen-enriched branched off waste gas and the oxygen-containing gas flow through the heat exchanger according to the counter-current principle.

3. Method as claimed in claim 1, wherein both the branched off waste gas and the heated oxygen-containing gas flow through the oxygen separation device according to the co-current principle.

4. Method as claimed in claim 2, wherein both the branched off waste gas and the heated oxygen-containing gas flow through the oxygen separation device according to the co-current principle.

5. A device for producing hot working gases for a gas turbine system, the device comprising:

a burner, the burner comprising:

an inlet side, where the burner is supplied on the inlet side with both oxygen-containing gas and fuel or a fuel/steam mixture to form a combustion mixture of oxygen-containing gas and fuel or fuel/steam mixture which burns within the burner and forms a hot combustion waste gas; and an outlet side, the outlet side being connected to a waste gas line through which the hot combustion waste gas exits from the burner and can be used at least in part as hot working gas;

an oxygen separation device, the oxygen separation device comprising:

a first inlet, where branched off hot combustion waste gas which is branched off from the waste gas line is supplied to the first inlet of the oxygen separation device;

a second inlet, where heated oxygen-containing gas is supplied to the second inlet of the oxygen separation device;

an oxygen separation means configured to transport oxygen from the heated oxygen-containing gas to the branched off hot combustion waste gas;

a first outlet from which oxygen-enriched combustion waste gas exits, the oxygen-enriched combustion waste gas supplying the burner inlet side; and a second outlet from which hot gas with reduced oxygen content exits, the hot gas with reduced oxygen content being used as a hot working gas;

a heat exchanger, the heat exchanger comprising:

a first inlet where relatively cool, oxygen-containing gas enters;

a first outlet coupled with the oxygen separation device second inlet wherein heated oxygen-containing gas exits the heat exchanger first outlet and enters the second inlet of the oxygen separation device from the heat exchanger first outlet;

a second inlet connected to the oxygen separation device first outlet; and a second outlet from which cooled oxygen-enriched combustion waste gas for supplying the burner exits.

6. Device as claimed in claim 5, wherein the heat exchanger second outlet connects to the burner inlet side via a supply line, the supply line including a compressor or fan.

7. Device as claimed in claim 5, wherein the heat exchanger is a two-cycle heat exchanger, the heat exchanger being configured such that the oxygen-enriched combustion waste gas and the oxygen-containing gas flow through the heat exchanger according to the counter current principle.

8. Device as claimed in claim 6, wherein the heat exchanger is a two-cycle heat exchanger, the heat exchanger being configured such that the oxygen-enriched combustion waste gas and the oxygen-containing gas flow through the heat exchanger according to the counter current principle.

9. Device as claimed in claim 5, wherein the oxygen separation device further includes a first chamber and a second chamber and the oxygen separation means has a membrane which divides the first chamber from the second chamber, the oxygen separation means transporting oxygen from the second chamber into the first chamber whereby the flow through the first chamber and the second chamber flows in the same direction and parallel to the membrane.

10. Device as claimed in claim 6, wherein the oxygen separation device further includes a first chamber and a second chamber and the oxygen separation means has a membrane which divides the first chamber from the second chamber, the oxygen separation means transporting oxygen from the second chamber into the first chamber whereby the flow through the first chamber and the second chamber flows in the same direction and parallel to the membrane.

11. Device as claimed in claim 7, wherein the oxygen separation device further includes a first chamber and a second chamber and the oxygen separation means has a membrane which divides the first chamber from the second chamber, the oxygen separation means transporting oxygen from the second chamber into the first chamber whereby the flow through the first chamber and the second chamber flows in the same direction and parallel to the membrane.

12. Device as claimed in claim 8, wherein the oxygen separation device further includes a first chamber and a second chamber and the oxygen separation means has a membrane which divides the first chamber from the second chamber, the oxygen separation means transporting oxygen from the second chamber into the first chamber whereby the flow through the first chamber and the second chamber flows in the same direction and parallel to the membrane.

* * * * *